(12) United States Patent
Lau (10) Patent No.: US 6,874,728 B2
(45) Date of Patent: Apr. 5, 2005

(54) SUPERMAN AIR MOTOR

(76) Inventor: Kingting Lau, Flat C. 12/F, Block 10, Cherry Mansios, Whampoa Garden (Site 2), Hung Hom, Kowloon (HK)

( * ) Notice: Subject to any disclaimer, the term of this patent is extended or adjusted under 35 U.S.C. 154(b) by 0 days.

(21) Appl. No.: 10/384,045

(22) Filed: Mar. 6, 2003

(65) Prior Publication Data

US 2004/0061023 A1 Apr. 1, 2004

(30) Foreign Application Priority Data

Aug. 15, 2002 (HK) .......................................... 02105975

(51) Int. Cl.[7] ............................................... B64C 39/00
(52) U.S. Cl. .......................................... 244/4 A; 244/62
(58) Field of Search .............................. 244/4 A, 23 R, 244/23 A, 23 D, 62

(56) References Cited

U.S. PATENT DOCUMENTS

| | | | | |
|---|---|---|---|---|
| 3,023,980 A | * | 3/1962 | Martin et al. | 244/4 A |
| 3,443,775 A | * | 5/1969 | Williams | 244/4 A |
| 3,506,221 A | * | 4/1970 | Jean et al. | 244/23 R |
| 4,040,577 A | * | 8/1977 | Moore | 244/4 A |
| 4,253,625 A | * | 3/1981 | Dmitrowsky | 244/4 A |
| 5,779,188 A | * | 7/1998 | Frick | 244/4 A |
| 6,488,232 B2 | * | 12/2002 | Moshier | 244/4 A |
| 2002/0113165 A1 | * | 8/2002 | Moshier | 244/4 A |

* cited by examiner

Primary Examiner—Peter M. Poon
Assistant Examiner—Timothy D Collins
(74) Attorney, Agent, or Firm—Blakely Sokoloff Taylor & Zafman (57) ABSTRACT

Provided is a disc-type jet turbine engine with controllable and rotational discharge ports at two sides of a discharge chamber, a fuel tank, and an operation lever connected with the discharge ports. The rotor shaft of the jet turbine engine is connected with a start-up electrical motor through a clutch and with a fuel pump through a gearbox. The fuel nozzle of the engine is connected with the fuel tank via the accelerator control valve and the fuel pump. The operation lever controls the clutch. The handle of the operation lever is provided with an electrical switch, a direction controller and an accelerator controller. The switch is electrically connected with the start-up electrical motor, the accelerator controller is connected to control the accelerator control valve, and the direction controller is connected with the discharge ports. Around the combustion chamber is an air-flow guide chamber having an air cooling and heat-insulate layer.

7 Claims, 9 Drawing Sheets

FIG. 16

SUPERMAN AIR MOTOR

TECHNICAL FIELD

This utility model relates to aircraft, especially to a superman air motor for making a single person fly.

BACKGROUND OF ART

In the ancient times, human beings wished to freely fly in the sky like a bird. The dream for human beings to fly towards the sky, further towards space, became reality through the invention of the airplane and the rocket. However, prior aircraft of any kind are generally not only huge in volume, but also too expensive to be suitable for a single person to fly. Also a cheap aircraft, such as a glider, can operate at a specific site only. Such aircraft can fly during a short time, and are not practical.

SUMMARY OF UTILITY MODEL

One object of this utility model is to provide a superman air motor which is practical and can continuously fly over a relative long time so as to overcome the above noted problems.

The said object is accomplished by the following described technical solution.

Provided is a superman air motor comprising a disc-type jet turbine engine, the controllable and rotational discharge ports provided at two sides of the discharge chamber for the disc-type jet turbine engine, a fuel tank, and an operation lever connected with the controllable and rotational discharge ports.

It is characterized in that, a rotor shaft of the disc-type jet turbine engine is connected with a start-up electrical motor through a clutch; the rotor shaft is connected with a fuel pump through a gearbox; the fuel nozzle of the disc-type jet turbine engine is connected with the fuel tank containing fuel through the fuel pipes via the accelerator control valve and the fuel pump;

a handle of the operation lever is provided with an electrical switch, a direction controller and an accelerator controller, the switch is electrically connected with the start-up electrical motor and a power source, the accelerator controller is connected with the accelerator control valve, the direction controller is connected with the controllable and rotational discharge ports.

In addition to the above necessary technical features, the following described technical content may be added during the specific practice.

The disc-type jet turbine engine is constructed as, a rotor shaft pivotally provided within a flat and circular housing with one end thereof provided with a turbine and the other end thereof provided with a centrifugal air compressing impeller; air guide vanes are provided around the air compressing impeller, air flow guide chambers and combustion chambers are provided behind said air guide vanes; and the air flow guide chambers are provided around the combustion chamber, said air flow guide chambers constitute an air cooling and heat insulation layer; an air inlet is provided at the location corresponding to the center of the centrifugal air compressing impellers, combusted air guide vanes facing the turbine are provided at the discharge outlet, and discharge chambers are provided behind the turbine discharge pipes are provided on said discharge chambers, the controllable and rotational discharge ports are provided at one end of the discharge pipes. The operation lever is constructed as to be taken back and opened from one side.

The discharge pipes are radially provided at the two sides of the discharge chambers.

The discharge pipes are radially provided at the one side of the discharge chambers.

A fuel filter is provided between the accelerator control valve and the fuel pump.

The advantages of this utility model are in that:

1. it utilizes general fuel and can operate over a long time;
2. an air-flow guide chamber is provided around the combustion chamber, said air-flow guide chamber constitutes an air-cooling and heat insulate layer to heat insulate the housing and the high temperature combustion chamber with effective heat insulation;
3. the fuel nozzles provide the high pressure jet of fuel from the fuel pump driven by the rotor shaft of the turbine engine; and
4. in addition to use in an aircraft for a single person, it is suitable to be used in other vehicles.

DESCRIPTION OF DRAWINGS

In order to better understand the structure, the features, the uses and the effectiveness for this utility model, further explanation is performed with reference to the detailed embodiments and the figures, in which:

FIGS. 14, 15, and 16 show the present utility model applied into other vehicles, wherein FIG. 15 is the top view of the jet turbine engine of FIG. 16.

DETAILED DESCRIPTION OF THE PREFERRED EMBODIMENTS

Figure 1:
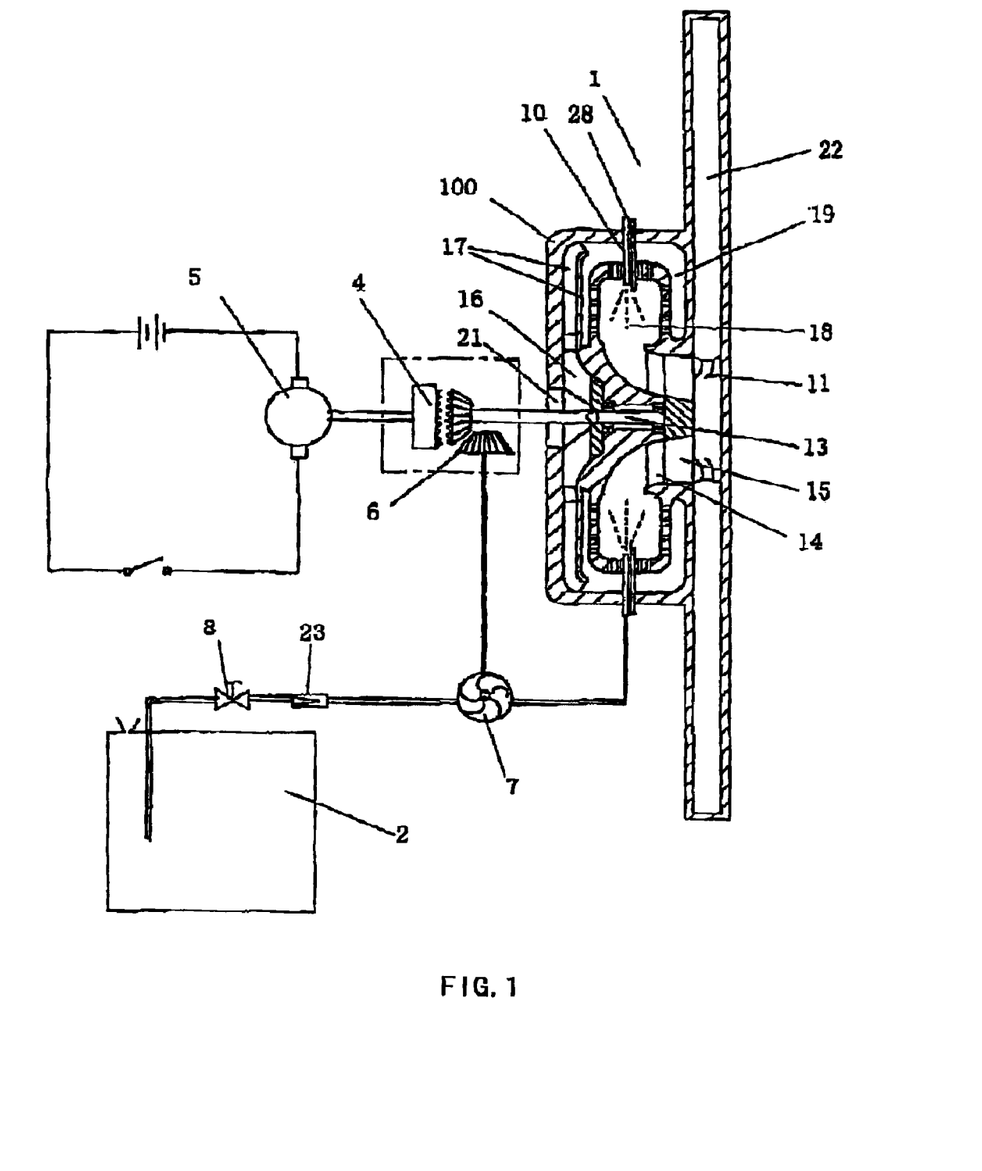
FIG. 1 shows the structure of an embodiment of the present utility model.
Figure 2:
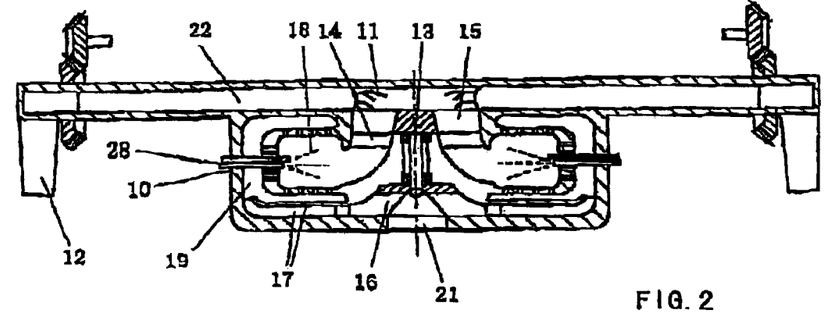
FIG. 2 is the cross section of the jet turbine engine according to the present utility model.
Figure 3:
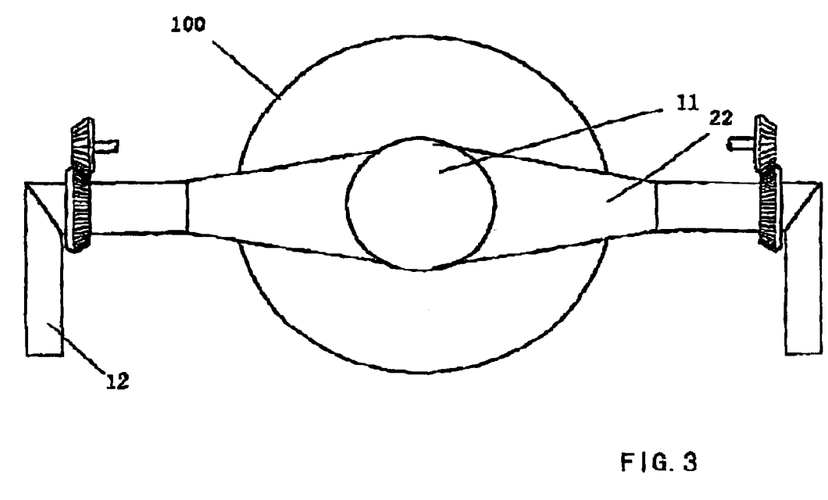
FIG. 3 is the top view of the jet turbine engine according to the present utility model.
Figure 8:
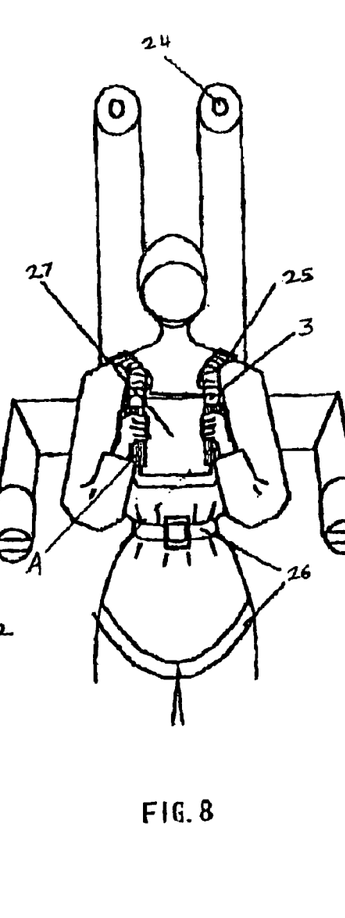
FIGS. 8, 9, and 10 are the views showing the superman air motor applied onto a human body.
Figure 9:
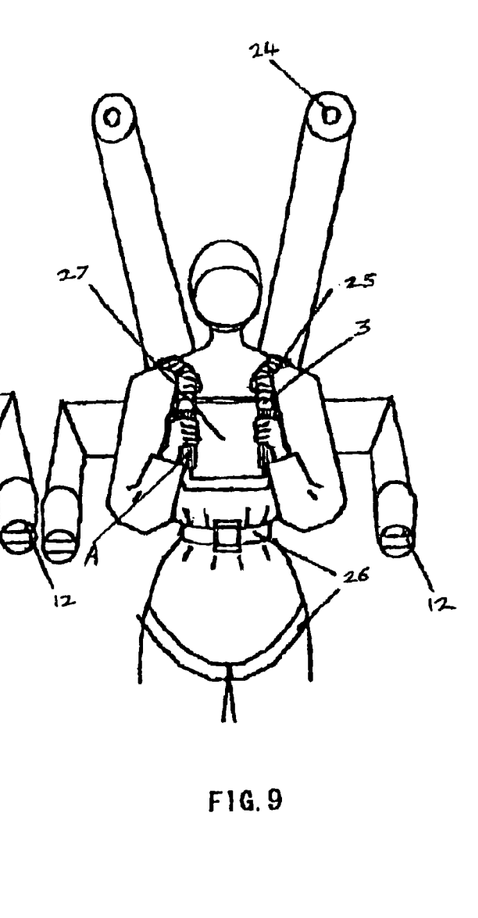
Figure 10:
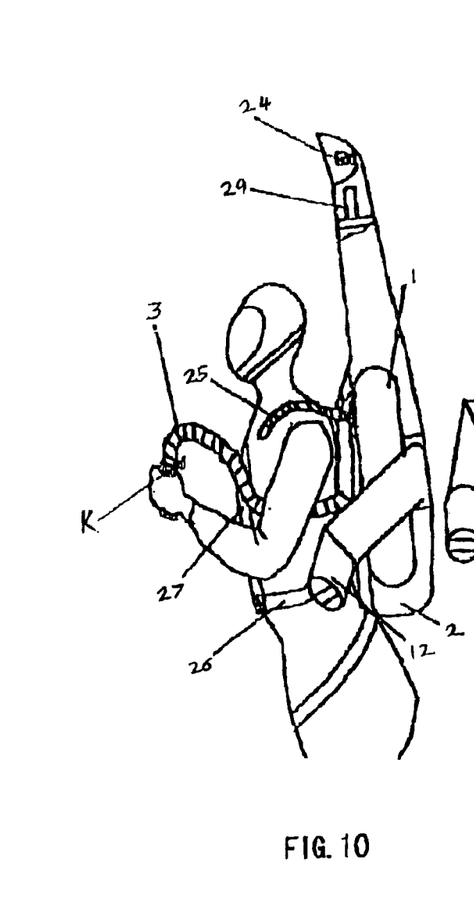
Figure 11:
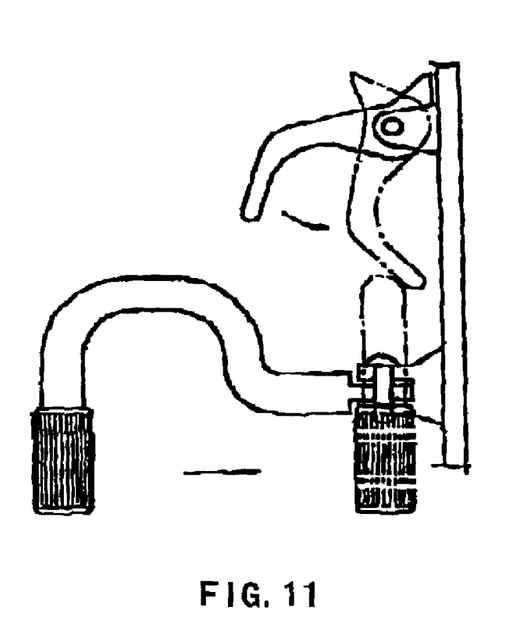
FIG. 11 shows the structures of the pull-push shoulder lever and the operation of one pull-push lever according to the present utility model.
Figure 12:
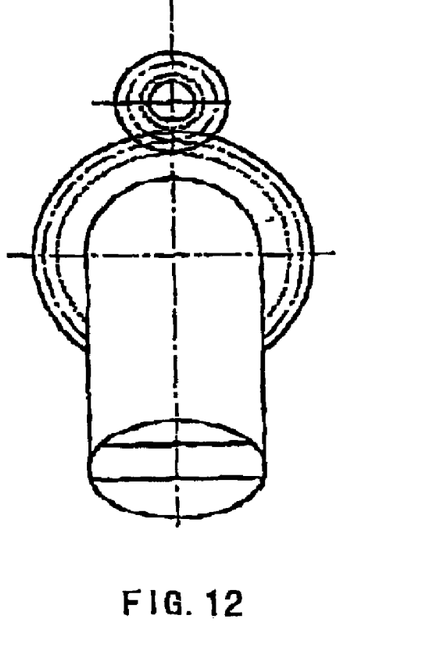
FIG. 12 shows the structure of the rotational discharge port according to the present utility model.

As shown in FIGS. 1–3, this utility model provides a superman air motor comprising a disc-type jet turbine engine 1, the controllable and rotational discharge ports 12 provided at two sides of the discharge chambers 11 for the disc-type jet turbine engine 1, a fuel tank 2 provided near the disc-type jet turbine engine 1, and an operation lever 3 connected with the controllable and rotational discharge ports, wherein:

a rotor shaft 13 of the disc-type jet turbine engine 1 is connected with the start-up electrical motor 5 through a clutch 4; the rotor shaft 13 is connected with a fuel pump 7 through a gearbox 6; the fuel nozzle 10 of the disc-type jet turbine engine 1 is connected with the fuel tank 2 containing fuel through the fuel pipe via the accelerator control valve 8 and the fuel pump 7; a handle of the operation lever 3 is provided with a start-up switch K, a direction controller and an accelerator controller "A" (e.g., as shown in FIGS. 8–10), the start-up switch K is electrically connected with the start-up electrical motor 5 and a power source, the accelerator controller is connected to control the accelerator control valve 8, the direction controller is connected with the controllable and rotational discharge ports 12 through gears (as shown in FIGS. 2–5 and 12). The operation lever 3 is constructed as to be taken back and opened from one side (as shown in FIG. 11).

Figure 4:
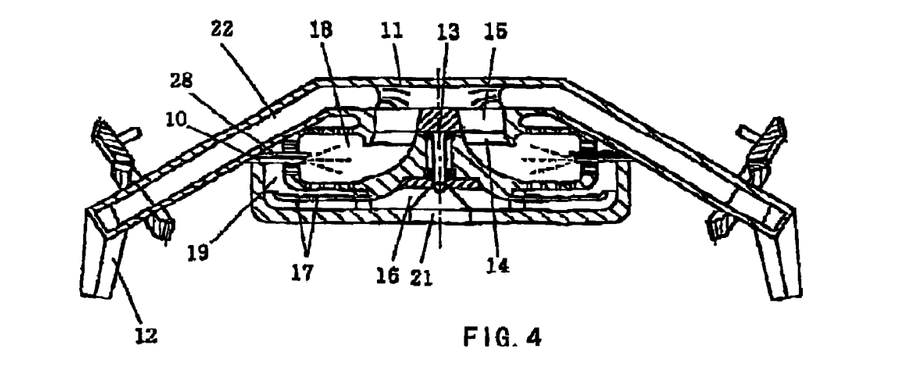
FIG. 4 is the cross section of another embodiment of the jet turbine engine according to the present utility model.
Figure 5:
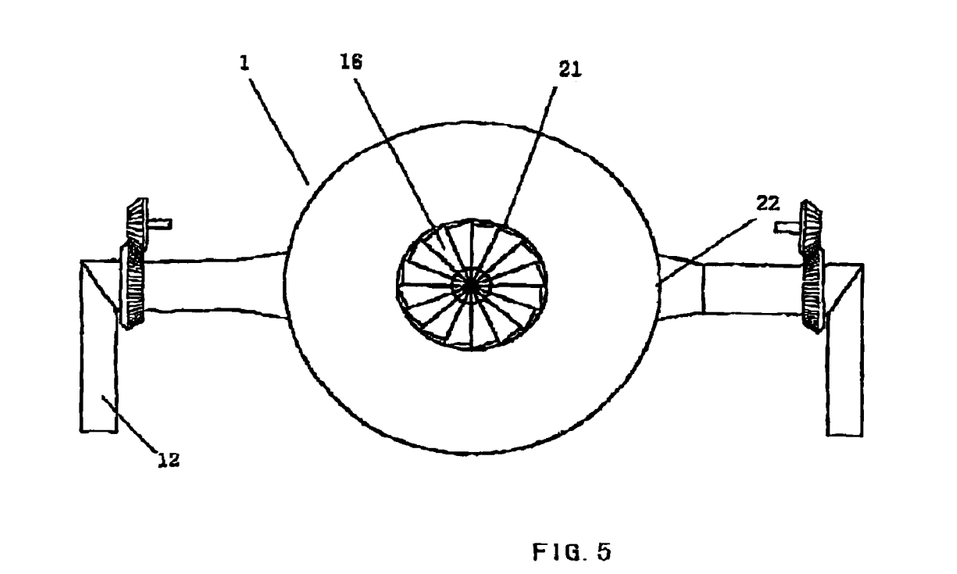
FIG. 5 is the top view of the jet turbine engine of FIG. 4.
Figure 6:
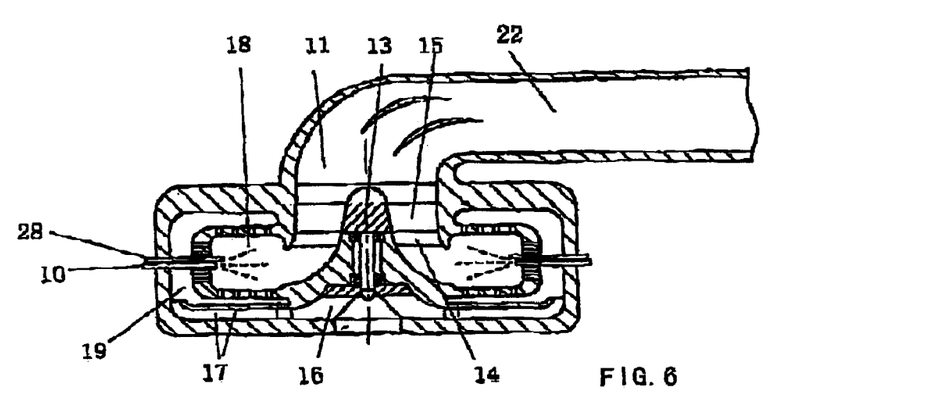
FIG. 6 is the cross section of another embodiment of the jet turbine engine according to the present utility model.
Figure 7:
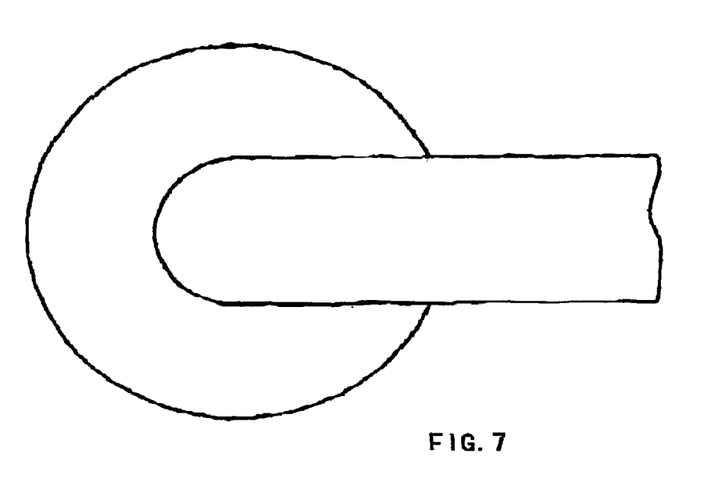
FIG. 7 is the top view of the jet turbine engine of FIG. 6.

The disc-type jet turbine engine 1 is constructed as, rotor shaft 13 within a circular housing 100 with one end thereof provided with a turbine 15 and the other end thereof provided with a centrifugal air compressing impeller 16; air guide vanes 17 are provided around the centrifugal air compressing impeller 16, Air flow guide chambers 19 and combustion chambers 18 are provided behind said air guide vanes 17; and the air flow guide chambers 19 are provided around the combustion chamber 18 said air flow guide chambers 19 constitute an air cooling and heat insulation layer; hollow combusted air guide vanes 14 facing the turbine 15 are provided at the discharge outlet of the combustion chamber 18, and discharge chambers 11 are provided behind the turbine 15, the discharge pipes 22 are radially provided at the two sides of the discharge chambers 11. The controllable and rotational discharge ports 12 are provided at the end of the discharge pipes 22. A fuel filter 23 is provided between the accelerator control valve 8 and the fuel pump 7. Spark plugs 28 are provided within the combustion chambers. The discharge pipes 22 radially provided at the two sides of the discharge chambers 11 may be lined up (as shown in FIGS. 2–3), or may be angularly and symmetrically provided (as shown in FIGS. 4–5). The discharge pipes 22 may also be radially provided at one side of the discharge chambers 11 (as shown in FIGS. 6 and 7).

The operation is described below. The operation lever 3 is operated to activate the start-up electrical motor 5 and to make the clutch 4 engaged to drive the rotor shaft 13 and the fuel pump 7 to rotate at a high speed with the accelerator controller operated to open the accelerator 8. The centrifugal air compressing impeller 16 provided at one end of the rotor shaft 13 rotates at a high speed to compress the air from the air inlet 21, through the air guide vanes 17 and the air flow guide chambers 19 into the combustion chambers 18. In the meantime, the fuel is pumped through the accelerator controllers, the fuel filter 23, the fuel pump 7 and the nozzle 10 into the combustion chambers 18. When the high pressure air and the fuel imported into the combustion chambers 18 are mixed completely, the spark plugs 28 provided in the combustion chambers 18 spark to ignite the mixture of air and fuel. Then the combusted mixture of air and fuel drives the turbine 15 via the hollow combusted air guide vanes 14 into the discharge chambers 11, and is discharged at a high speed from the controllable and rotational discharge ports 12 through the discharge pipes 22. The accelerator may be operated to control the push force by the accelerator controller provided at the handle, and the direction of the discharge ports to control the flight direction is controlled by the operation lever 3.

FIGS. 8, 9, and 10 show an embodiment of the superman air motor of this utility model to fly a human body. Here, the fuel tank can be designed as U type (as shown in FIG. 8) or V type (not shown) with its top provided with a power and electronics chamber 29, and a lighting lamp 24 is provided on the top of the power and electronics chamber 29. A fuel tank 2 is provided behind the disc-type jet turbine engine 1. A shoulder press lever 25 of push-pull type (as shown in FIG. 11) is provided at a suitable site of the air inlet of the engine. The whole air motor is set onto the human body by the shoulder press lever 25 of pull push type and the operation lever 3 of pull-push type with the air motor secured to the human legs through a secure belt 26. A safety parachute 27 is provided at the front chest of the human.

Figure 13:
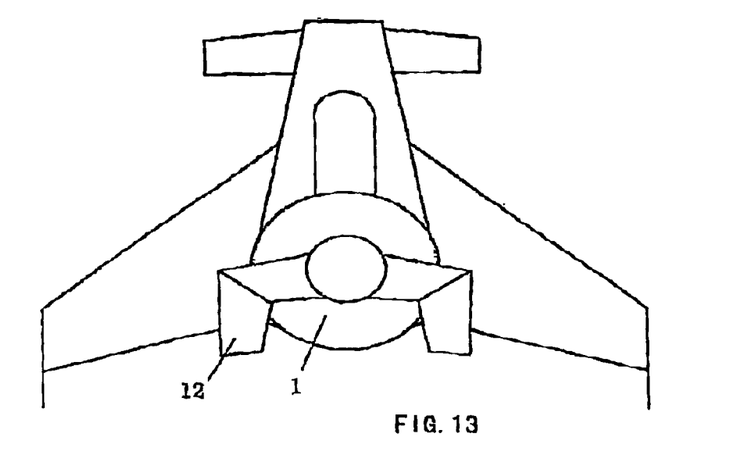
FIG. 13 shows the present utility model applied into a miniairplane.
Figure 14:
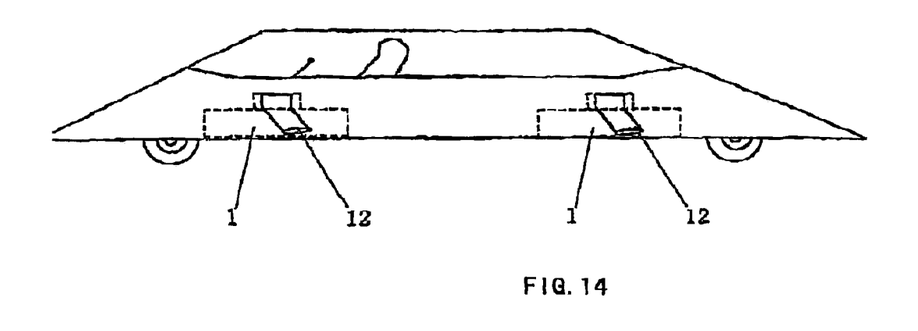
Figure 15:
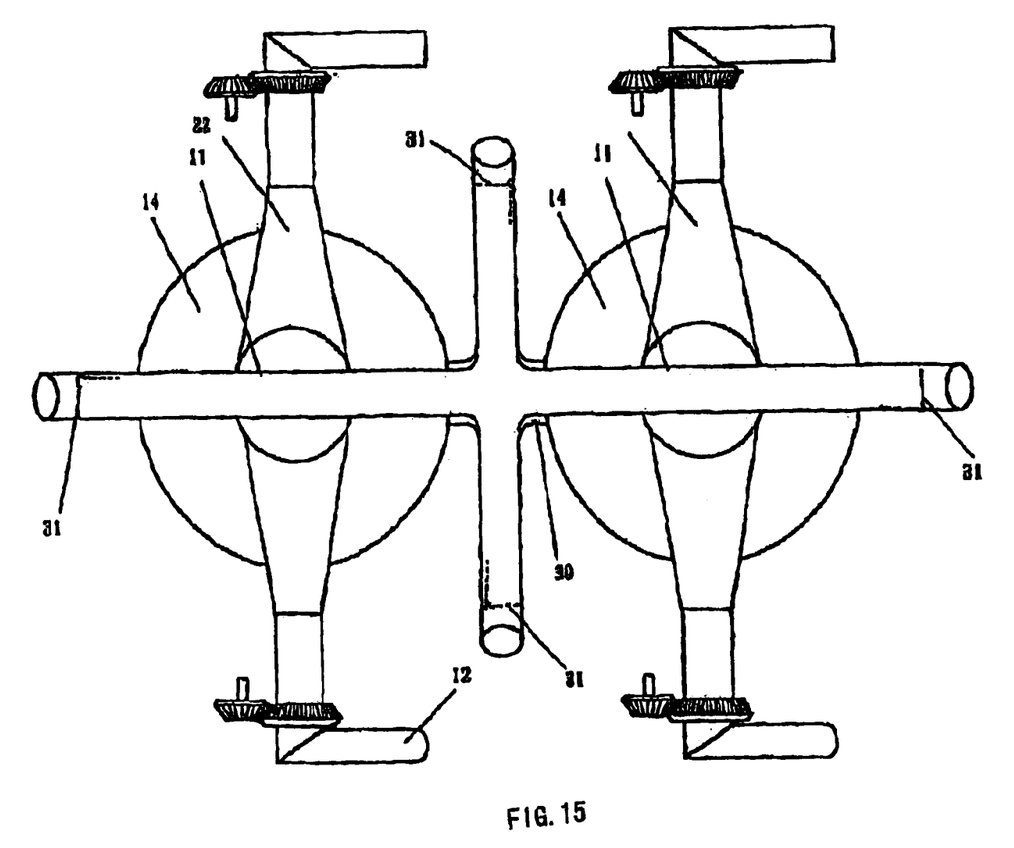
Figure 16:
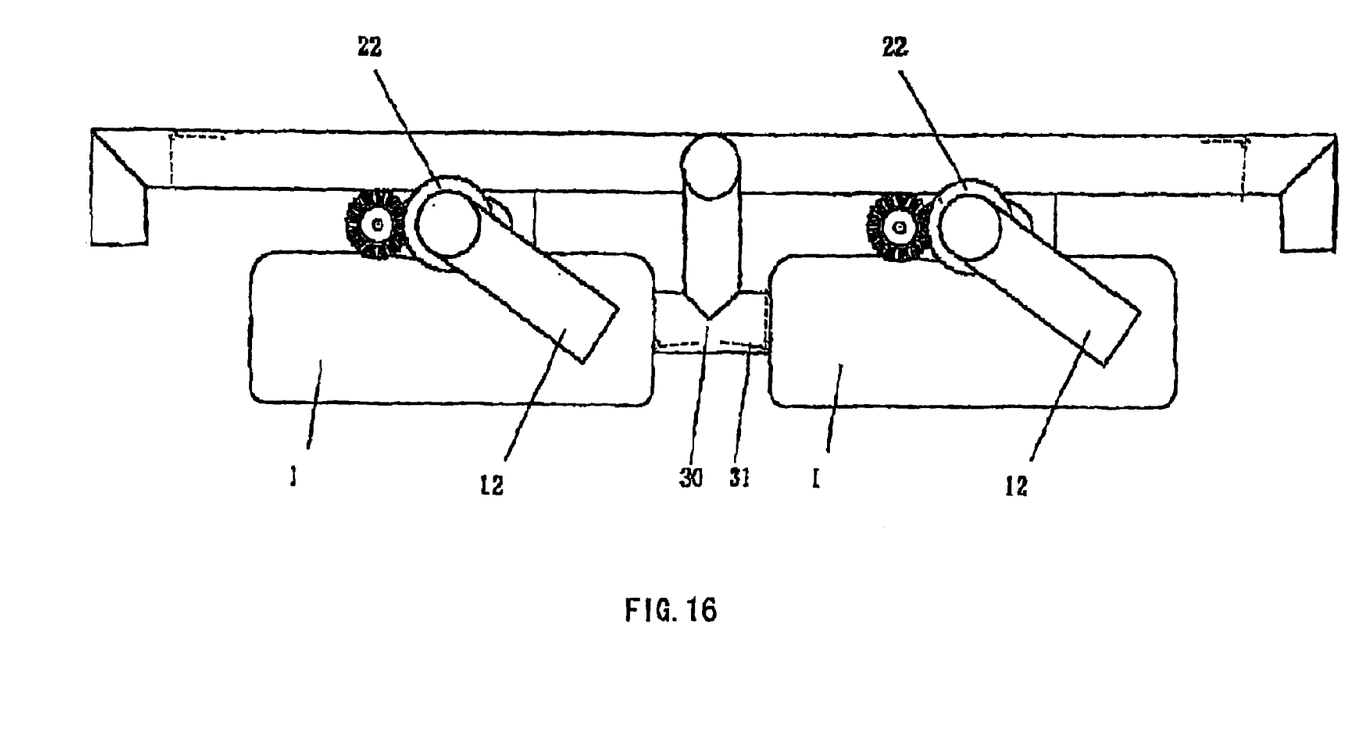

FIGS. 13 and 14 show this utility model applied into an airplane and a vehicle. The embodiments of FIGS. 14, 15, and 16 are provided with two disc-type jet turbine engines 1 in serial to provide greater pushing power or force for a vehicle or aircraft. The two disc-type jet turbine engines 1 are connected in serial by a pipe 30 in which is provided a controllable valves 31.

In short, this utility model can operate for a longer time, has a superior design, is more practical, and has more uses than the prior art.

We claim:

1. A superman air motor, to attach to a human comprising a disc-type jet turbine engine, a plurality of controllable and rotational discharge ports provided at two sides of the discharge chamber for the turbo-jet engine, a fuel tank, and an operation lever connected with the controllable and rotational discharge ports, characterized in that, a rotor shaft of the disc-type jet turbine engine is connected with a start-up electrical motor through a clutch; the rotor shaft is connected with a fuel pump through a gearbox; a plurality of fuel nozzles of the disc-type jet turbine engine are connected with the fuel tank containing fuel through a plurality of fuel pipes via an accelerator control valve and the fuel pump;

a handle of the operation lever is provided with an electrical switch, a direction controller and an accelerator controller, the switch is electrically connected with the start-up electrical motor and a power source, the accelerator controller is connected to control the accelerator control valve, the direction controller is connected with the controllable and rotational discharge ports.

2. A superman air motor as set forth in claim 1, characterized in that, the disc-type jet turbine engine is constructed as, the rotor shaft is pivotally provided within a flat and circular housing with one end thereof provided with a turbine and an other end thereof provided with a centrifugal air compressing impeller; and air guide vanes are provided around the centrifugal air compressing impeller, air flow guide chambers and combustion chambers are provided behind said guide vanes;

and the air flow guide chambers comprising an air cooling and heat insulation layer provided around the combustion chamber; an air inlet is provided at a location corresponding to a center of the centrifugal air compressing impeller combusted air guide vanes facing the turbine are provided at a discharge outlet, and discharge chambers are provided behind the turbine, discharge pipes are provided on said discharge chambers, the controllable and rotational discharge ports are provided at one end of the discharge pipes.

3. A superman air motor as set forth in claim 1, characterized in that, the operation lever is able to be opened or taken in, so that the space occupied by the superman air motor can be reduced when unused.

4. A superman air motor as set forth in claim 1 characterized in that, the discharge pipes are radially provided at two sides of the discharge chambers.

5. A superman air motor as set forth in claim 1, characterized in that, the discharge pipes are radially provided at one side of the discharge chambers.

6. A superman air motor as set forth in claim 1, characterized in that, a fuel filter is provided between the accelerator control valve and the fuel pump.

7. A disc-type jet turbine engine as defined in claim 1, characterized in that, a plurality of the disc-type jet turbine engines can be connected in series so as to provide greater pushing power.

* * * * *